United States Patent
Kwa et al.

(10) Patent No.: US 10,202,047 B2
(45) Date of Patent: **\*Feb. 12, 2019**

(54) ELECTRICAL CHARGING SYSTEM FOR A ROBOT

(71) Applicant: Locus Robotics Corp., Wilmington, MA (US)

(72) Inventors: Hian Kai Kwa, Reading, MA (US); Christina Nicole Fong, Somerville, MA (US); Michael Sussman, Winchester, MA (US)

(73) Assignee: Locus Robotics Corp., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,051

(22) Filed: Dec. 6, 2017

(65) Prior Publication Data

US 2018/0093578 A1 Apr. 5, 2018

Related U.S. Application Data

(63) Continuation of application No. 15/088,519, filed on Apr. 1, 2016, now Pat. No. 9,840,154.

(51) Int. Cl.
*B60L 11/18* (2006.01)
*H01R 13/05* (2006.01)
(Continued)

(52) U.S. Cl.
CPC .......... *B60L 11/1827* (2013.01); *H01R 13/05* (2013.01); *H01R 13/6205* (2013.01);
(Continued)

(58) Field of Classification Search
CPC .................................................. B60L 11/1827
(Continued)

(56) References Cited

U.S. PATENT DOCUMENTS

| 3,703,621 A | 11/1972 | Viola et al. |
| 7,332,890 B2 * | 2/2008 | Cohen ............... A47L 9/2857 |
| | | 320/109 |

(Continued)

FOREIGN PATENT DOCUMENTS

| EP | 1632319 A1 | 3/2006 |
| EP | 2617531 A1 | 7/2013 |

OTHER PUBLICATIONS

International Search Report with Written Opinion, dated Jul. 24, 2017, received in international patent application No. PCT/US2017/025649, 12 pages.

*Primary Examiner* — Suresh Memula
(74) *Attorney, Agent, or Firm* — Verrill Dana, LLP; John W. Powell

(57) ABSTRACT

An electrical charging system including an electrical charger assembly with a charger base coupled to an electrical power source. There is a first male terminal member terminating in a first electrical contact with at least two curved external surfaces and one flat surface. There is a second male terminal member terminating in a second electrical contact with at least two curved external surfaces and one flat surface. There is a cavity formed between the first male terminal member and the second male terminal member having an opening between the first and second electrical contacts. The cavity is defined by the flat surface of the first male terminal member and the flat surface of the second male terminal member. The flat surface of the second male terminal member has a flared surface portion proximate the opening of the cavity and angled relative to the second axis.

20 Claims, 13 Drawing Sheets

(51) Int. Cl.
    *H01R 13/62* (2006.01)
    *H02J 7/00* (2006.01)
(52) U.S. Cl.
    CPC .......... *H02J 7/0042* (2013.01); *H02J 7/0044* (2013.01); *H02J 7/0009* (2013.01); *H02J 7/0027* (2013.01)
(58) Field of Classification Search
    USPC ........................................................ 320/109
    See application file for complete search history.

(56) References Cited

U.S. PATENT DOCUMENTS

| | | | |
|---|---|---|---|
| 7,708,578 B1 | 5/2010 | Lenox | |
| 8,027,750 B2* | 9/2011 | Orita | B25J 19/005 |
| | | | 320/107 |
| 8,390,251 B2 | 3/2013 | Cohen et al. | |
| 8,439,698 B1 | 5/2013 | Saini et al. | |
| 8,461,803 B2 | 6/2013 | Cohen et al. | |
| 9,178,370 B2 | 11/2015 | Henricksen et al. | |
| 9,203,184 B1 | 12/2015 | Hui | |
| 9,229,454 B1 | 6/2016 | Chiappetta et al. | |
| 9,463,927 B1 | 10/2016 | Thheobald | |
| 2005/0113972 A1 | 5/2005 | Kumhyr | |
| 2008/0174268 A1* | 7/2008 | Koo | A47L 9/2805 |
| | | | 320/109 |
| 2010/0026239 A1* | 2/2010 | Li | H02J 7/0044 |
| | | | 320/109 |
| 2010/0026247 A1* | 2/2010 | Kim | H02J 7/0036 |
| | | | 320/162 |
| 2010/0286823 A1 | 11/2010 | Neki | |
| 2010/0296908 A1 | 11/2010 | Ko | |
| 2011/0089891 A1* | 4/2011 | Pai | H02J 7/0044 |
| | | | 320/107 |
| 2011/0200420 A1 | 8/2011 | Driskill | |
| 2011/0241616 A1* | 10/2011 | Kim | H02J 7/025 |
| | | | 320/108 |
| 2011/0316474 A1* | 12/2011 | Kimura | B60L 11/1827 |
| | | | 320/107 |
| 2012/0049798 A1 | 3/2012 | Cohen et al. | |
| 2012/0086389 A1* | 4/2012 | Li | A47L 9/2805 |
| | | | 320/107 |
| 2012/0169284 A1 | 7/2012 | Park | |
| 2012/0253655 A1 | 10/2012 | Yamada | |
| 2012/0330458 A1 | 12/2012 | Weiss | |
| 2013/0221908 A1* | 8/2013 | Tang | B25J 19/005 |
| | | | 320/107 |
| 2013/0317642 A1 | 11/2013 | Asaria et al. | |
| 2014/0203764 A1* | 7/2014 | Ireland | H02J 7/0042 |
| | | | 320/107 |
| 2014/0360832 A1 | 12/2014 | Aldrich | |
| 2015/0115876 A1* | 4/2015 | Noh | H02J 7/0042 |
| | | | 320/107 |
| 2015/0210174 A1* | 7/2015 | Settele | B60L 11/1818 |
| | | | 320/109 |
| 2016/0075021 A1 | 3/2016 | Cohen et al. | |

\* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

402a — L01001A
402b — L01001B
402c — L01001C
402d — L01001D
402e — L01001E
402f — L01001F
404 — Fiducial ID

FIG. 7

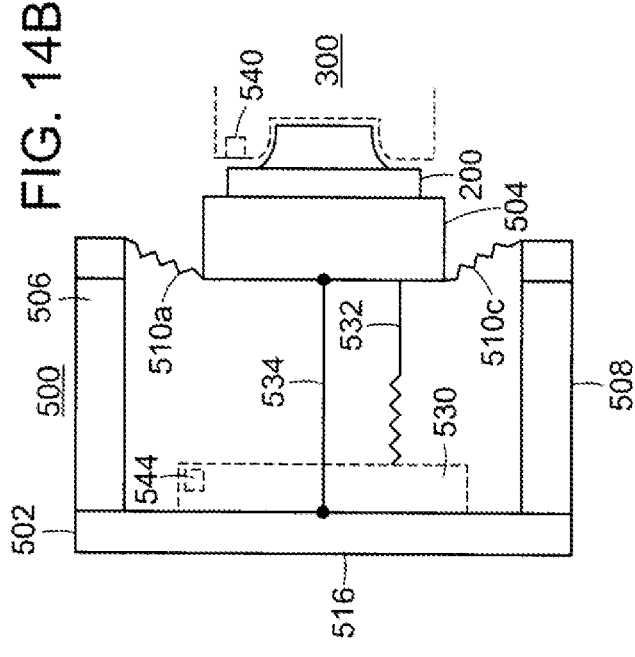
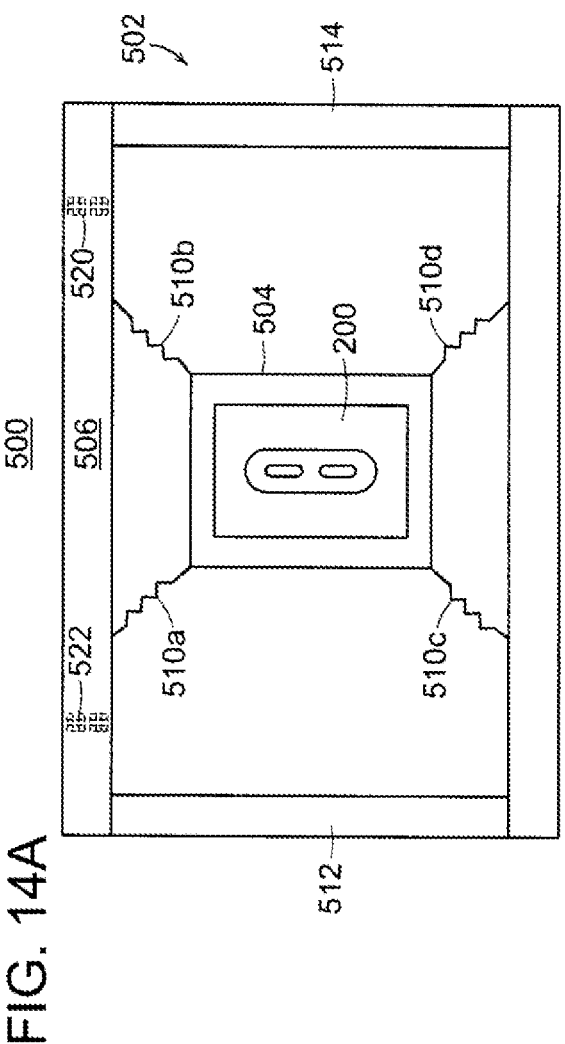
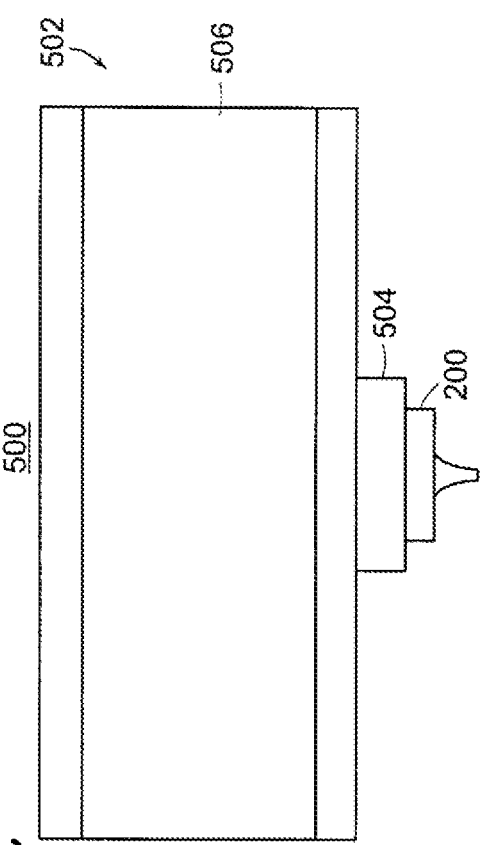

ELECTRICAL CHARGING SYSTEM FOR A ROBOT

CROSS-REFERENCE TO RELATED APPLICATION

This application is a continuation of and claims priority to U.S. patent application Ser. No. 15/088,519 filed Mar. 1, 2016, now granted as U.S. Pat. No. 9,840,154 on Dec. 12, 2017, and entitled "ELECTRICAL CHARGING SYSTEM FOR A ROBOT", which is herein incorporated by reference in its entirety.

FIELD OF INVENTION

This invention relates to an electrical charging system and more particularly to such an electrical charging system for use in charging a robot.

BACKGROUND OF THE INVENTION

In many applications, robots are used to perform functions in place of humans or to assist humans in order to increase productivity and efficiency. One such application is order fulfillment, which is typically performed in a large warehouse filled with products to be shipped to customers who have placed their orders over the internet for home delivery.

Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible. In addition, the products that will ultimately be shipped first need to be received in the warehouse and stored or "placed" in storage bins in an orderly fashion throughout the warehouse so they can be readily retrieved for shipping.

Using robots to perform picking and placing functions may be done by the robot alone or with the assistance of human operators and can increase efficiency substantially. The robots are powered by electricity, which is stored in batteries on board the robot. With all of the travelling that the robots do around the warehouse they must be regularly recharged. Therefore, for the operation to run smoothly, an efficient and effective way to charge the robots is a requirement.

BRIEF SUMMARY OF THE INVENTION

In one aspect, the invention features an electrical charging system, including an electrical charger assembly with charger base coupled to an electrical power source. There is a first male terminal member having a first base affixed to and extending orthogonally along a first axis from a first surface of the charger base and terminating in a first electrical contact. The first male terminal member has a plurality of external surfaces at least two of which are curved from the first base to the first electrical contact and at least one flat surface. There is a second male terminal member having a second base affixed to and extending orthogonally along a second axis from the first surface of the charger base and terminating in a second electrical contact. The second male terminal member has a plurality of external surfaces at least two of which are curved from the second base to the second electrical contact and at least one flat surface. There is a cavity formed between the first male terminal member and the second male terminal member having an opening between the first and second electrical contacts. The cavity is defined by the at least one flat surface of the first male terminal member and the at least one flat surface of the second male terminal member. The at the least one flat surface of the second male terminal member having a flared surface portion proximate the opening of the cavity and angled relative to the second axis.

In other aspects of the invention one or more of the following features may be included. The at least one flat surface of the first male terminal member may have a recessed surface portion proximate the opening of the cavity. There may further be included an electrical charging port coupled to a battery of a device to be charged, the electrical charging port configured to receive the electrical charger assembly to electrically charge the battery of the device to be charged. The electrical charging port may comprise a first cavity and second cavity, which are configured to receive and engage with the first male terminal member and the second male terminal member, respectively, of electrical charging assembly. The first cavity may include a first electrical contact comprising spring loaded pins configured to engage with the first electrical contact of the first male terminal member and the second cavity may include a second electrical contact comprising spring loaded pins configured to engage with the second electrical contact of the second male terminal member. The curved surfaces of the first male terminal member and the curved surfaces of the second male terminal member may have a first radius of curvature. The first cavity may comprise curved surfaces having a second radius of curvature and the second cavity may include curved surfaces having the second radius of curvature. The first radius of curvature may be substantially equal to the second radius of curvature.

In yet other aspects of the invention one or more of the following features may be included. The first cavity may have a width and length at its opening which is greater than a width and length of the first male terminal member proximate the first electrical contact and the second cavity may have a width and length at its opening which is greater than a width and length of the second male terminal member proximate the second electrical contact. There may further be included a divider disposed between the first cavity and the second cavity to separate the first cavity and the second cavity. The divider may be configured to be received in the cavity of electrical charging assembly when the electrical charging assembly and the electrical charging port are mated. The divider may include a stop on a surface of the divider to prevent the electrical charger assembly from being improperly mated with the electrical charging port if the first male terminal member is being engaged with the second cavity and the second male terminal member is being engaged with the first cavity. The stop may include an angled surface portion and flat surface portion configured to engage with the recessed surface portion within the cavity of the electrical charging assembly, thereby allowing proper mating of electrical charging assembly and the electrical charging port.

In further aspects of the invention one or more of the following features may be included. One of the electrical charging assembly and the electrical charging port may include a plurality of magnets and the other of the electrical charging assembly and the electrical charging port may include a corresponding plurality of metal contacts which engage when the electrical charging assembly and the electrical charging port are mated to secure them in place by way of magnetic force. There may further be included a docking station having a frame to which the electrical charging assembly is affixed. The electrical charging assembly may be disposed on a mount and the mount may be secured to the frame by way of a plurality of compliant mounting members to allow movement of the electrical charging assembly in all six degrees of freedom. The docking station may include a fiducial marker identifying the location of the docking station. The docking station may include a charging unit electrically connected to electrical charging assembly to provide power for charging the device. The docking station may include a restraining device interconnected to the frame of the docking station and the mount on which the electrical charging assembly is disposed to limit movement of the electrical charging assembly during the un-mating process. The charging unit may include a transceiver and the electrical charging port includes a transceiver to enable communication between the charging unit and the device during the charging process. The device being charged may be a robot.

In another aspect, the invention features an electrical charging system for a robot, having an electrical charger assembly. The electrical charger assembly includes a charger base coupled to an electrical power source. There is a first male terminal member having a first base affixed to and extending orthogonally along a first axis from a first surface of the charger base and terminating in a first electrical contact. The first male terminal member has a plurality of external surfaces at least two of which are curved from the first base to the first electrical contact and at least one flat surface. There is a second male terminal member having a second base affixed to and extending orthogonally along a second axis from the first surface of the charger base and terminating in a second electrical contact. The second male terminal member has a plurality of external surfaces at least two of which are curved from the second base to the second electrical contact and at least one flat surface. There is a cavity formed between the first male terminal member and the second male terminal member having an opening between the first and second electrical contacts. The cavity is defined by the at least one flat surface of the first male terminal member and the at least one flat surface of the second male terminal member. The at least one flat surface of the first male terminal member having a recessed surface portion proximate the opening of the cavity and the at the least one flat surface of the second male terminal member having a flared surface portion proximate the opening of the cavity and angled relative to the second axis. There is an electrical charging port coupled to a battery of a robot to be charged. The electrical charging port includes first and second cavities to receive, respectively, the first and second male terminal members of the electrical charging assembly. The electrical charging port further includes a divider disposed between the first and second cavities. The divider is configured to be received by the cavity between the first male terminal member and the second male terminal member of the electrical charger assembly when the electrical charger assembly and the electrical charger port are mated.

These and other features of the invention will be apparent from the following detailed description and the accompanying figures.

BRIEF DESCRIPTION OF THE FIGURES

FIG. 6 is a table of the fiducial identification to pose mapping;

FIG. 7 is a table of the bin location to fiducial identification mapping;

FIG. 14A is a front elevational view of the charger docking station;

FIG. 14B is a side elevational view of the charger docking station; and

FIG. 14C is a top down view of the charger docking station.

DETAILED DESCRIPTION OF THE INVENTION

The invention is directed to an electrical charging system for use in charging robots. Although not restricted to any particular robot application, one suitable application that the invention may be used in is order fulfillment. The use of robots in this application will be described to provide context for the electrical charging system.

Figure 1:
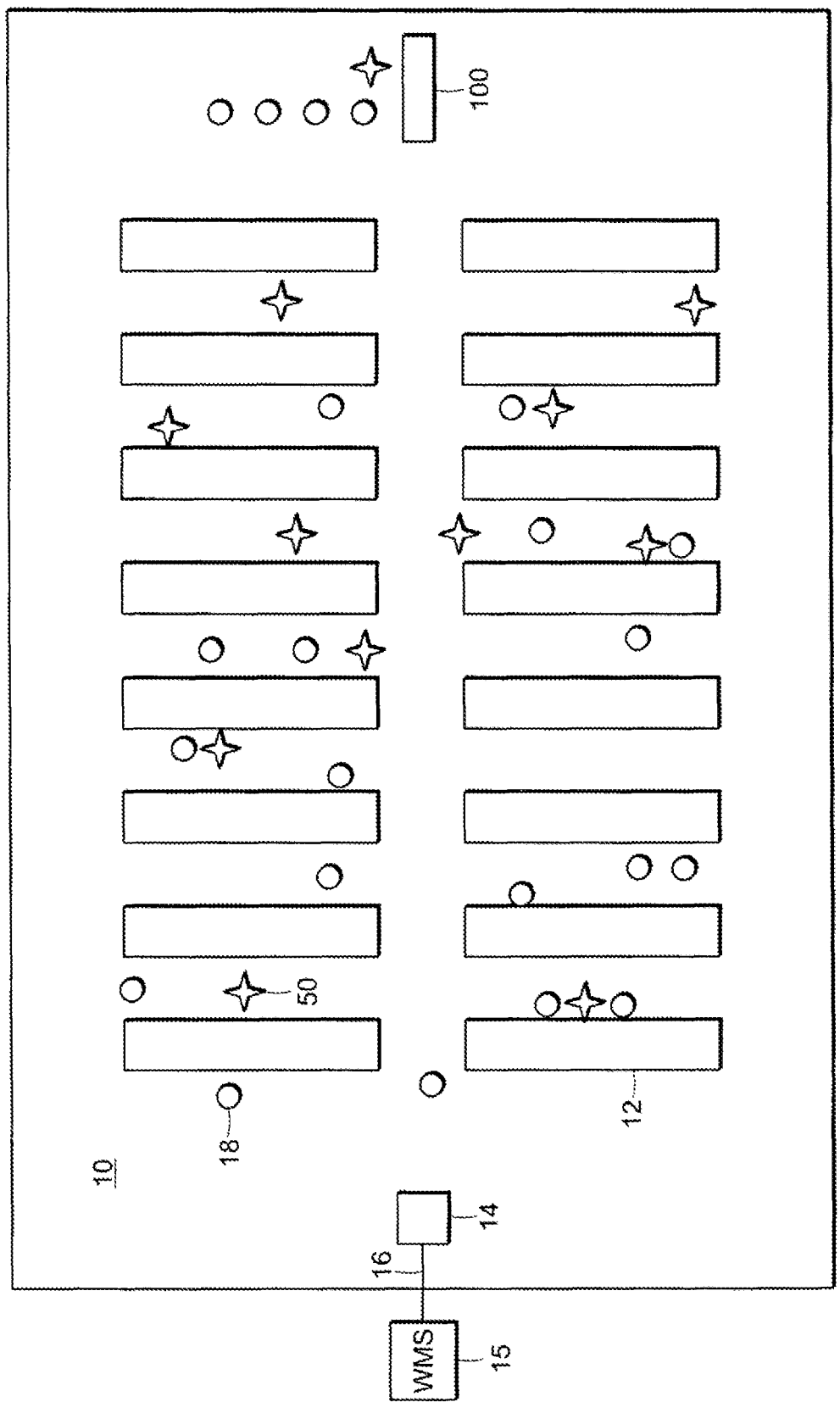
FIG. 1 is a top plan view of an order-fulfillment warehouse.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10.

Figure 2:
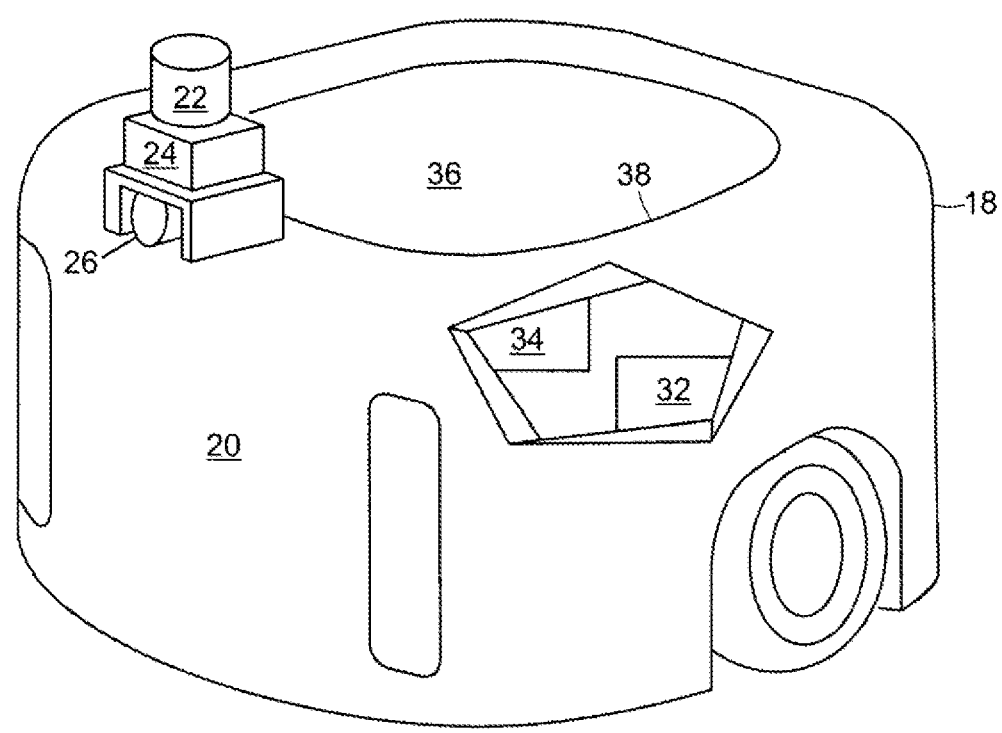
FIG. 2 is a perspective view of a base of one of the robots used in the warehouse shown in FIG. 1.
Figure 3:
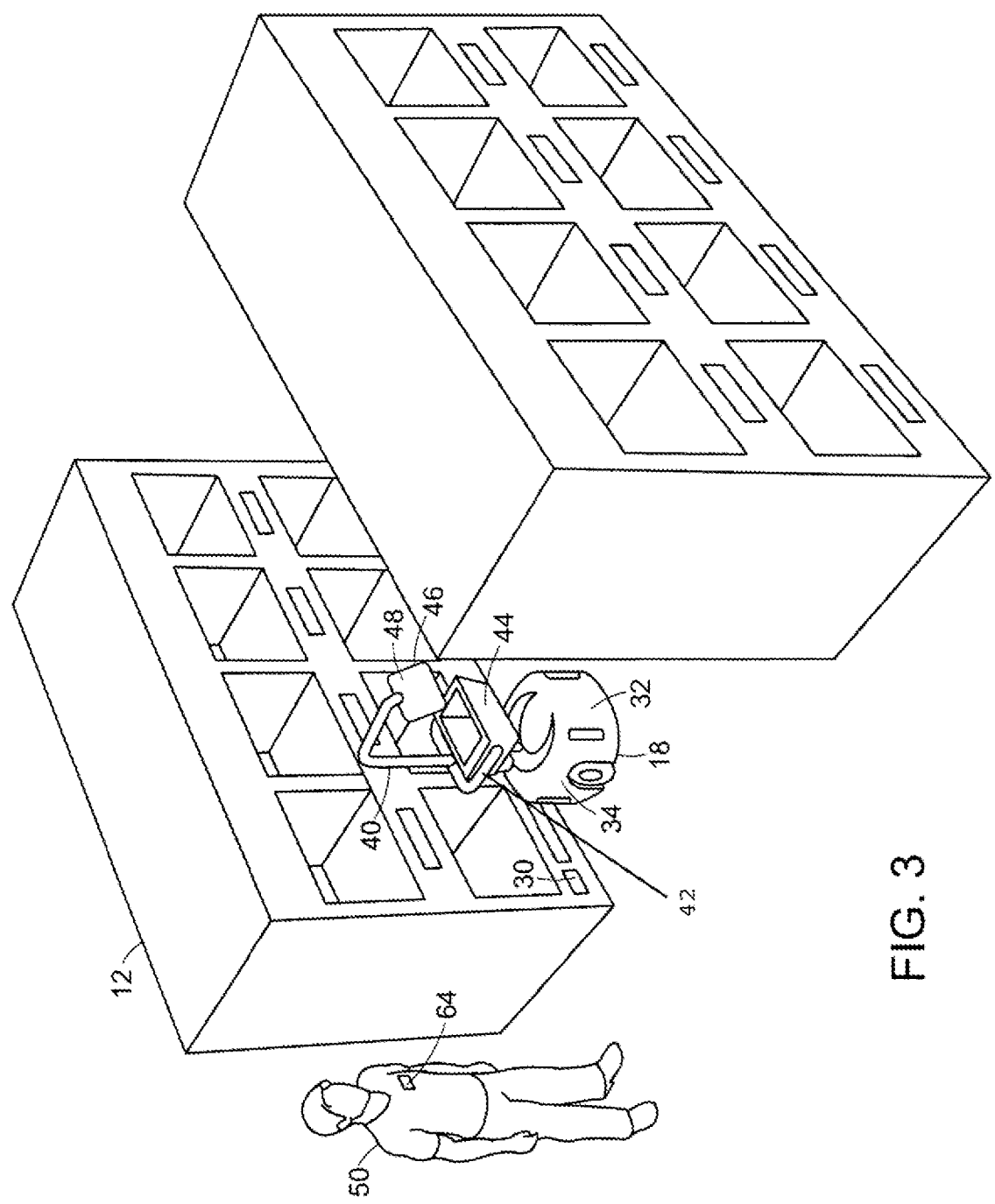
FIG. 3 is a perspective view of the robot in FIG. 2 outfitted with an armature and parked in front of a shelf shown in FIG. 1.
Figure 11:
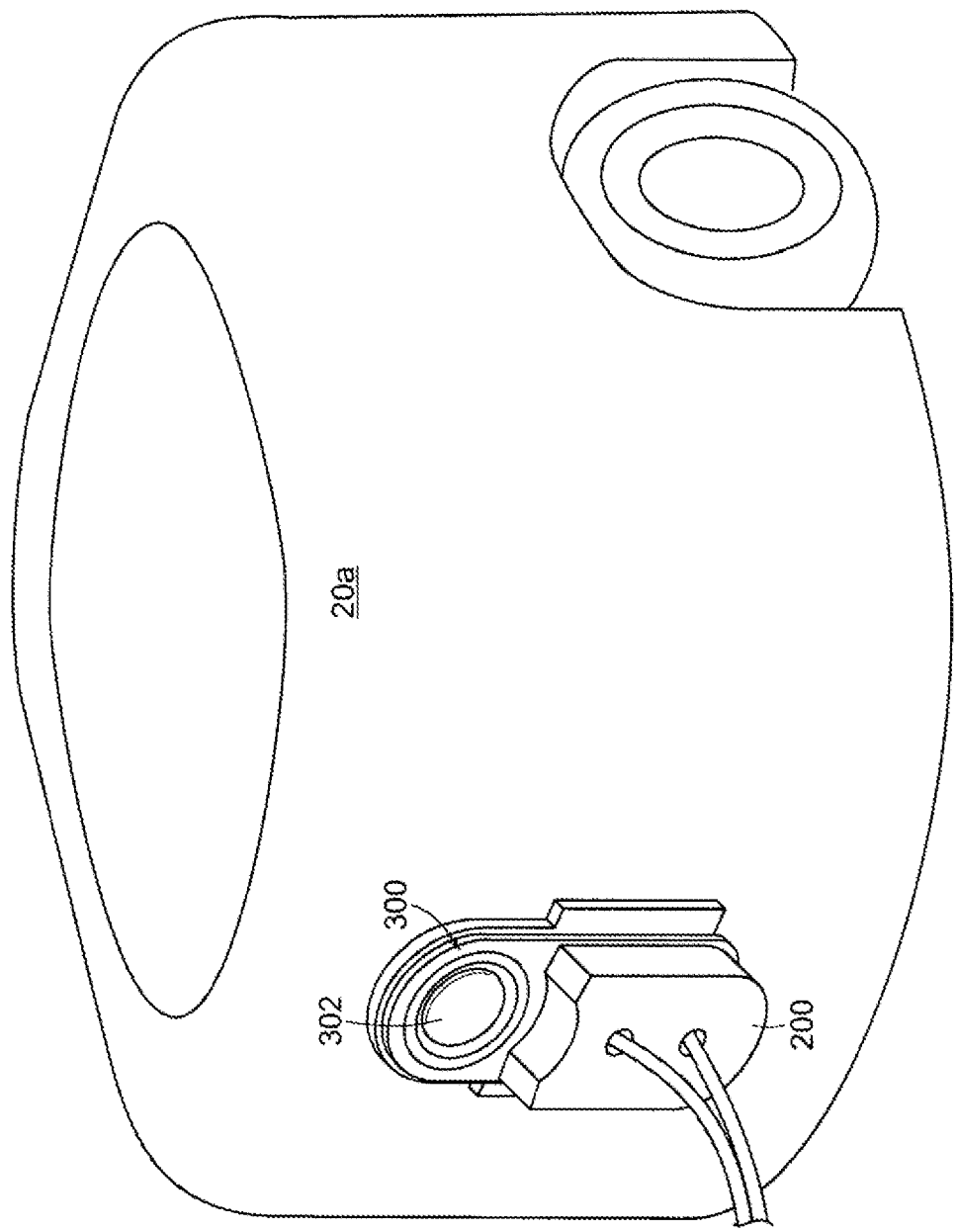
FIG. 11 is a perspective view of the electrical charging assembly of FIG. 9 mated with the electrical charging port according to this invention mounted on a robot.
Figure 12:
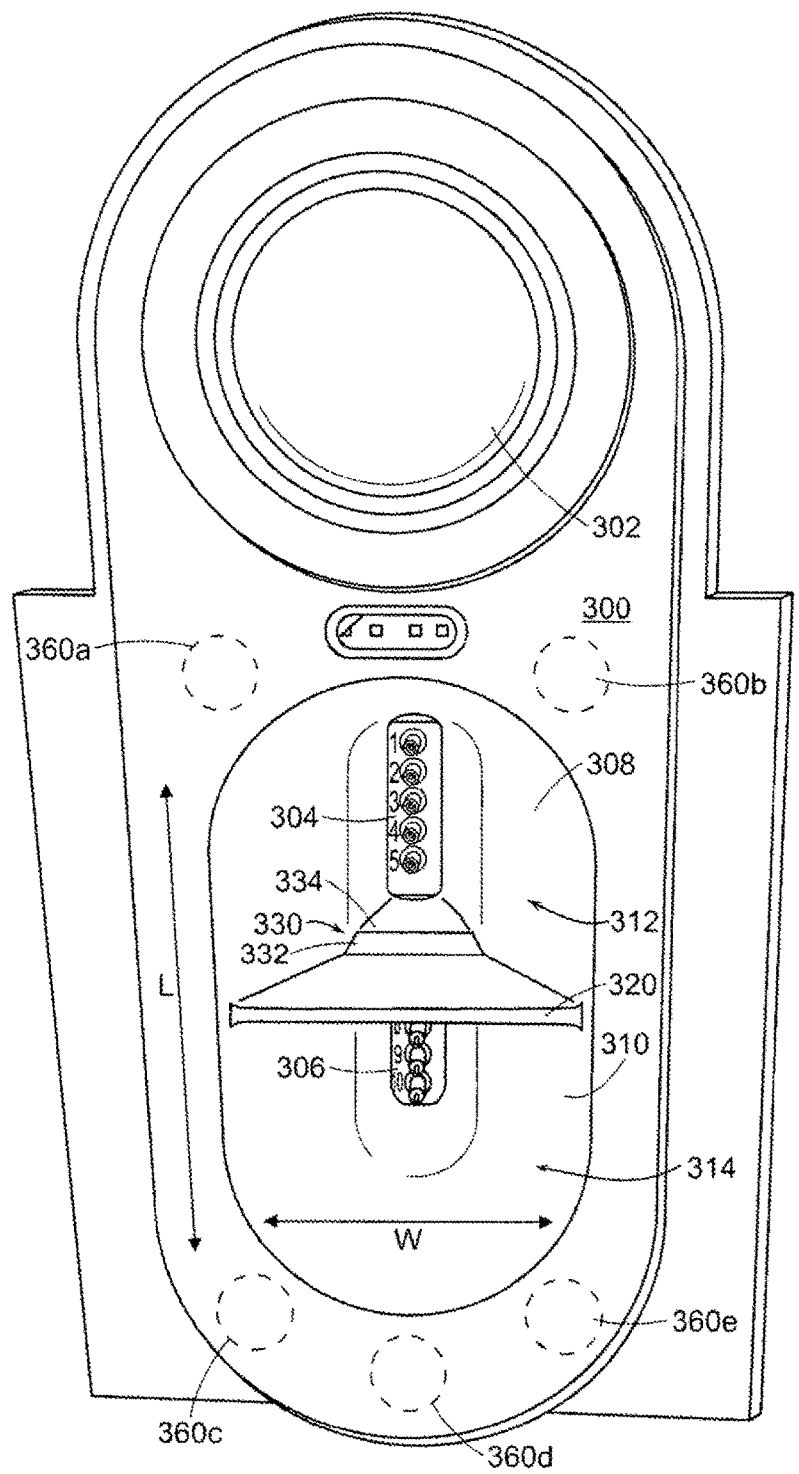
FIG. 12 is a perspective view of the electrical charging port of FIG. 11.

In a preferred embodiment, a robot 18, shown in FIG. 2, includes an autonomous wheeled base 20 having a laser-radar 22. The base 20 also features a transceiver 24 that enables the robot 18 to receive instructions from the order-server 14, and a camera 26. As depicted in FIGS. 11 and 12, the robot base also includes an electrical charging port for re-charging the batteries which power autonomous wheeled base 20. The base 20 further features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

While the initial description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Referring again to FIG. 2, an upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48, which the local operator 50 can read, or by transmitting the order to a handheld device used by the local operator 50.

Upon receiving an order 16 from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and dynamically updated to determine the location of objects, both static and dynamic, as well as the locations of various fiducial markers dispersed throughout the warehouse. To do this, one of the robots 18 navigate the warehouse and build/update a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
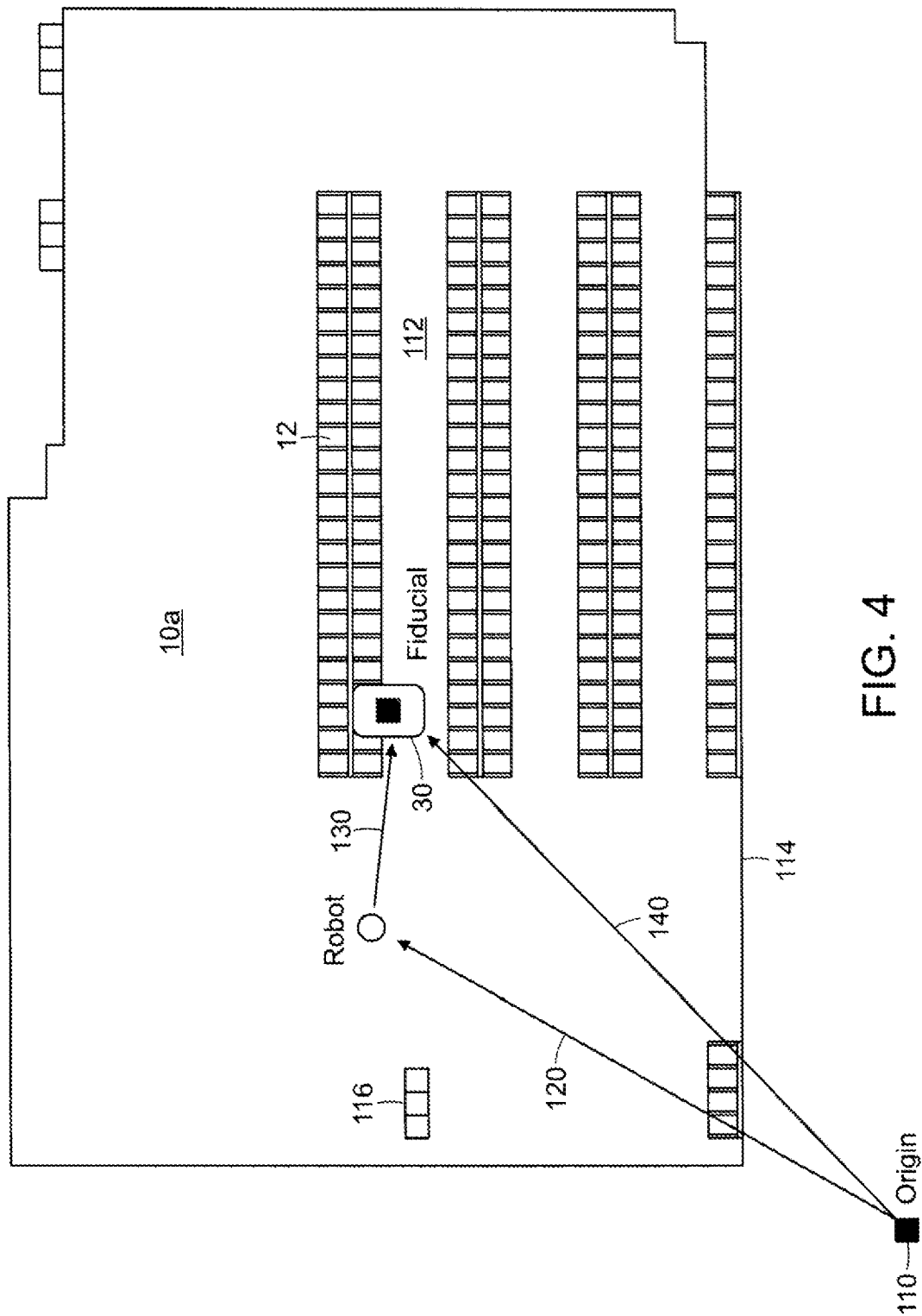
FIG. 4 is a partial map of the warehouse of FIG. 1 created using laser radar on the robot.

While constructing the map 10a or thereafter, one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
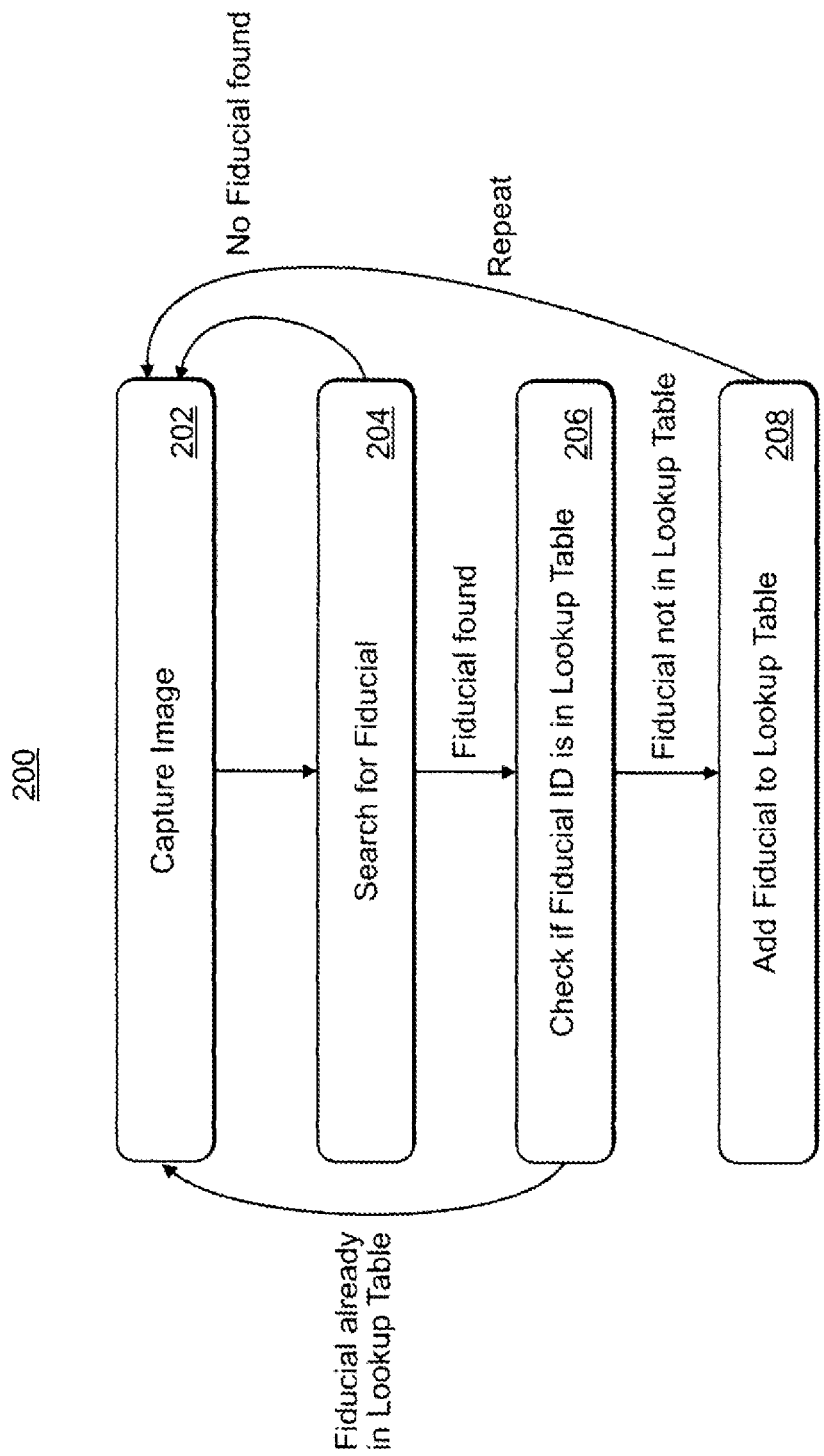
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x, y, z coordinates in the warehouse along with the orientation or the quaternion (x, y, z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11".

The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose as described herein.

Figure 8:
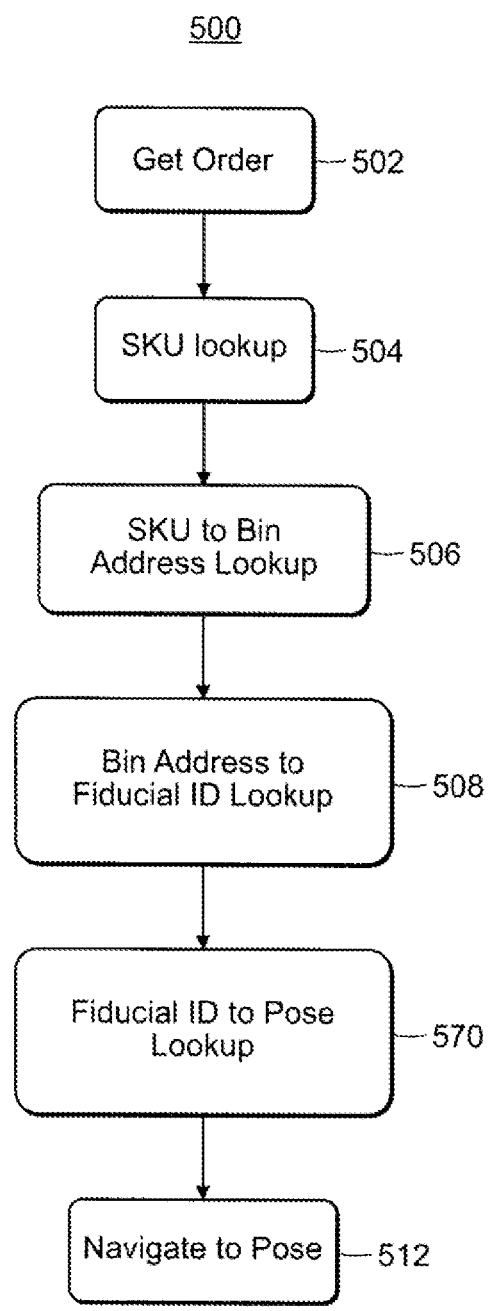
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

As described above, Robots 50 need to be periodically re-charged. In addition to marking locations in the warehouse where items are stored, a fiducial marker may be placed at one or more electrical charging station(s) within the warehouse. When robot 18 is low on power it can navigate to a fiducial marker located at an electrical charging station so it can be recharged. Once there it can be manually recharged by having an operator connect the robot to the electrical charging system or the robot can use its navigation to dock itself at the electrical charging station.

Figure 9:
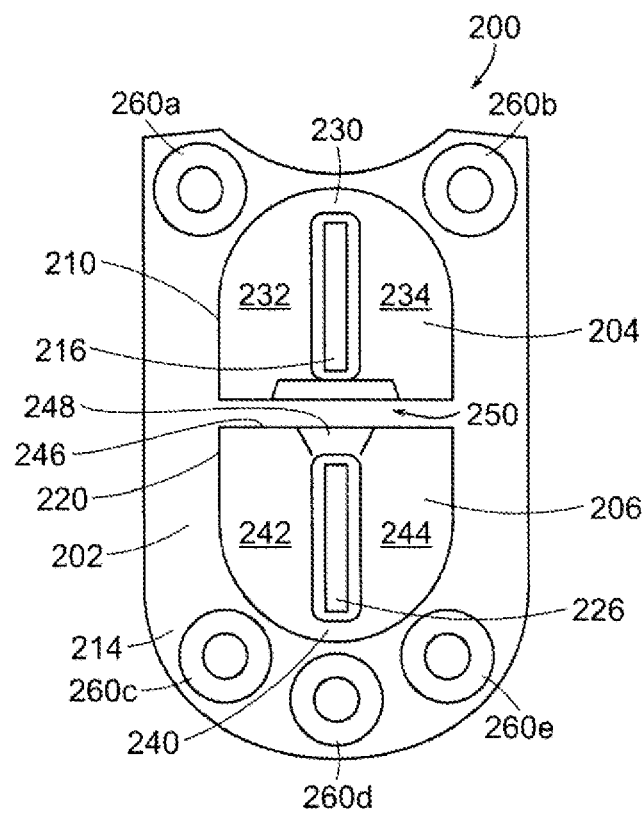
FIG. 9 is a front view of an electrical charging assembly according to this invention.
Figure 10:
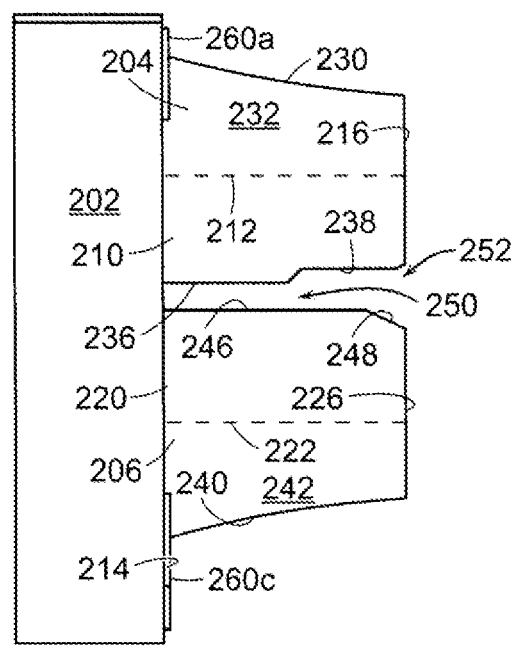
FIG. 10 is a side elevational view of the electrical charging assembly of FIG. 9.

As shown in FIGS. 9 and 10, electrical charging assembly 200 may be used at an electrical charging station. Electrical charging assembly 200 includes charger base 202 on which are disposed a first male terminal member 204 and a second male terminal member 206. Although not shown in this figure, a positive electrical input from the electrical service in the warehouse would be affixed to charger base 202 and electrically connected to one of the first male terminal member 204 or the second male terminal member 206. Also, a negative electrical input would be affixed to charger base 202 and electrically connected to the other of the first male terminal member 204 or the second male terminal member 206.

First male terminal member 204 has first base 210 affixed to and extending orthogonally along a first axis 212 from surface 214 of the charger base 202 and terminates in a first electrical contact 216. First electrical contact 216 may be in the form of a copper bus bar which extends into charger base 202 to which would be affixed one of the positive or negative electrical connections. Second male terminal member 206 has second base 220 affixed to and extending orthogonally along a second axis 222 from surface 214 of the charger base 202 and terminates in a second electrical contact 226. Second electrical contact 226 may also be in the form of a copper bus bar which extends into charger base 202 to which would be affixed the other of the positive or negative electrical connections.

The first male terminal member 204 has a plurality of external surfaces at least two of which have a curved shape from the first base 210 to the first electrical contact 216 forming a concave surface. In the embodiment depicted in FIGS. 9 and 10 there are three curved surfaces; namely, top curved surface 230 and opposing side curved surfaces 232 and 234, the three of which curve from first base 210 to first electrical contact 216, with particular radii of curvature, forming concave surfaces. In this embodiment, the radius of curvature of opposing side curved surfaces 232 and 234 is approximately 63.9 mm. The radius of curvature of top curved surface 230 is approximately 218.7 mm. These were determined empirically to provide for optimized alignment correction. More misalignment is expected in the horizontal direction as compared to the vertical direction; therefore, the opposing side curved surfaces are provided with a smaller radius of curvature. Of course, the radii of curvature of the curved surfaces may be varied depending on the application.

In addition, first male terminal member 204 has a flat surface 236 which is substantially parallel to first axis 212 and orthogonal to surface 214 of charger base 202. Flat surface 236 includes a recessed surface portion 238 proximate first electrical contact 216.

The second male terminal member 206 has a plurality of external surfaces at least two of which have a curved shape from the second base 220 to the second electrical contact 226, forming a concave surface. In the embodiment depicted in FIGS. 9 and 10 there are three curved surfaces; namely, bottom curved surface 240 and opposing side curved surfaces 242 and 244, the three of which curve from first base 220 to first electrical contact 226, with particular radii of curvature, forming concave surfaces. In this embodiment, the radius of curvature of opposing side curved surfaces 242 and 244 is approximately 63.9 mm. The radius of curvature of bottom curved surface 240 is approximately 218.7 mm. These were determined empirically to provide for optimized alignment correction. More misalignment is expected in the horizontal direction as compared to the vertical direction; therefore, the opposing side curved surfaces are provided with a smaller radius of curvature. Of course, the radii of curvature of the curved surfaces may be varied depending on the application.

In addition, second male terminal member 206 has a flat surface 246, which is substantially parallel to second axis 222 and orthogonal to surface 214 of charger base 202. Flat surface 246 includes a flared surface portion 248 proximate second electrical contact 226.

There is a cavity 250 formed between the first male terminal member 204 and the second male terminal member 206 defined by the at least one flat surface 236 of the first male terminal member 204 and the at least one flat surface 246 of the second male terminal member 206. Cavity 250 has an opening 252 between the first electrical contact 216 and the second electrical contact 226. At opening 252, the recessed surface portion 238 of flat surface 236 and the flared surface portion 248 of flat surface 246, are present.

Referring again to FIGS. 9 and 10, metal contacts 260a-e are disposed on charger base 202. These metal contacts engage with corresponding magnets on electrical charging port 300, described below, and secure electrical charging assembly 200 and electrical charging port 300 in place while charging. Alternatively, the magnets could be disposed on the charger base 202 with the metal contacts on charging port 300.

In FIG. 11, electrical charging port 300 is depicted affixed to a robot base 20a (comparable to autonomous wheeled base 20, FIG. 2). In FIG. 11, electrical charging assembly 200 is shown mated with electrical charging port 300 while the robot base 20a is being charged. Once the robot navigates to a fiducial marker associated with the charging station, it can either be manually recharged by having an operator connect the electrical charging assembly 200 to electrical charging port 300 of robot base 20a or the robot can use its navigation to dock itself to a fixed electrical charging assembly 200 mounted on a charger docking station, as shown in FIGS. 14a-c and described below.

If the robot is docking to a fixed electrical charging assembly 200, it uses camera 302 to maneuver it into position so that electrical charging port 300 can mate with electrical charging assembly 200. The camera may use the fiducial marker associated with the charging station as a reference point for fine localization. As the robot maneuvers into place, achieving perfect alignment for mating of the electrical contacts 216 and 226 of the electrical assembly 200 with electrical contacts 304 and 306, respectively, of electrical charging port 300 can be difficult. Therefore, electrical charging assembly 200 and electrical charging port 300 have been specifically designed in order to ensure easier, more efficient, and less problematic mating to allow the robots to electrically re-charge more quickly.

Figure 13:
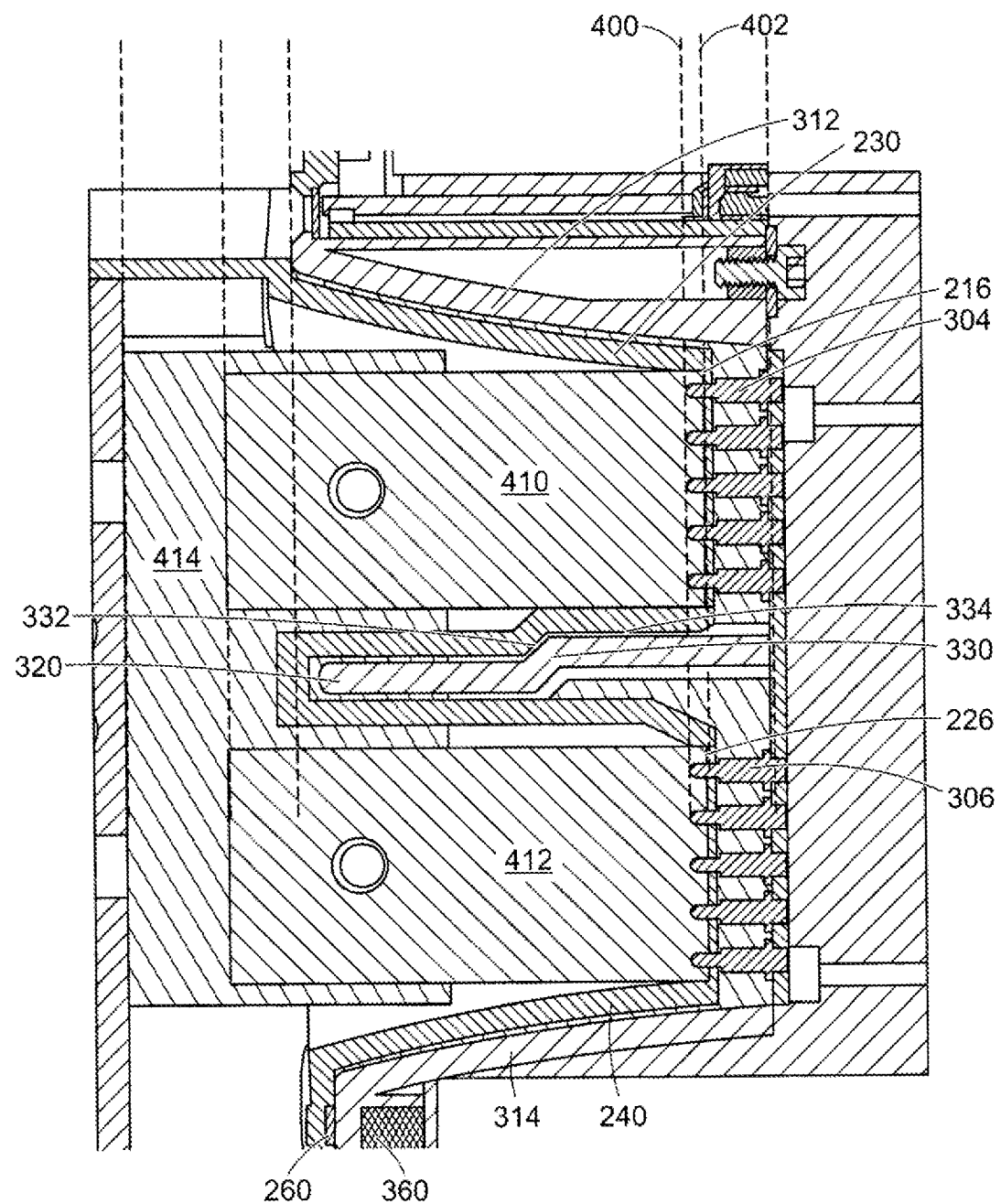
FIG. 13 is a cross-sectional view of the electrical charging assembly mated with the electrical charging port.

As can be seen in FIGS. 12 and 13, electrical charging port 300 includes a first cavity 308 and second cavity 310, which are configured to receive and engage with first male terminal member 204 second male terminal member 206, respectively, of electrical charging assembly 200, as robot base 20a is docking. Cavity 308 has concave, curved surfaces 312 which are complimentary to the curved surfaces 230, 232 and 234 of first male terminal member 204. In other words, the first cavity 308 may include curved surfaces 312 having radii of curvature substantially equal to the radii of curvature of the curved external surfaces (230, 232, and 234) of first male terminal member 204. Substantially equal in this case means just slightly larger to allow insertion and removal of first male terminal member 204 in cavity 308. Cavity 310 also has concave, curved surfaces 314 which are complimentary to the curved surfaces 240, 242 and 244 of second male terminal member 206. In other words, the second cavity 310 may include curved surfaces 314 having radii of curvature substantially equal to the radii of curvature of the curved external surfaces (240, 242, and 244) of second male terminal member 206. Substantially equal in this case means just slightly larger to allow insertion and removal of second male terminal member 206 in cavity 310.

The openings of cavities 308 and 310 are wider and longer than the width/length of the electrical contacts 216/226 of first male terminal member 204 second male terminal member 206. The extra width/length allows the first male terminal member 204 second male terminal member 206 to be more easily received within cavities 308 and 310 even if they are somewhat misaligned in the horizontal/vertical directions during the mating process. As the robot base 20a moves toward electrical charging assembly 200, the engagement of the complimentarily curved surfaces cause the first male terminal member 204 and the second male terminal member 206 to be guided into alignment so that engagement between electrical contacts 216/226 of electrical charging assembly and electrical contacts 304/306 of electrical charging port 300 will occur.

Thus, the radii of mating parts (male terminal members and cavities) are designed to provide coarse alignment when the male terminal members are first inserted into the cavities, and fine adjustment as full insertion is approached.

The electrical charging system of this invention provides an additional feature for easier vertical alignment. This is accomplished by the interaction of divider 320, which is between cavities 308 and 310, in combination with opening 352 of cavity 350 of electrical charging assembly 200. Flared surface portion 248 provides a wider opening so, if there is vertical misalignment, it causes the divider 320 to ride up vertically into place in cavity 350, as the docking process occurs.

When the first and second male terminals 204 and 206 fully inserted into cavities 308 and 310, electrical charging assembly 200 is secured in place with electrical charging port 300 by means of magnets 360a-e, which engage with metal contacts 260a-e on electrical charging assembly 200. The magnets may be disposed beneath the external surface of electrical charging port 300 and, as such, they are shown in phantom.

There is an additional feature included in the electrical charging system, which is useful in the case of manual charging by an operator. If the electrical charging assembly 200 were inserted into the electrical charging port 300 improperly, i.e. upside down with electrical contact 216 of electrical charging assembly 200 connected to electrical contacts 306 of electrical charging port 300 and with electrical contact 226 of electrical charging assembly connected to electrical contacts 304 of electrical charging port 300, the polarities would be reversed and significant damage to robot base 20a would result.

To prevent this from happening, a stop 330 (see FIGS. 12 and 13) is included on the surface of divider 320 of electrical charging port 300. The stop 330 has an angled surface portion 332 and flat surface portion 334. As shown in FIG. 10, within cavity 250 of electrical charging assembly 200, there is a recessed surface portion 238, which allows for full insertion of electrical charging assembly 200 into electrical charging port 300. Recess 238 allows for clearance by first male terminal member 204 of stop 330 as the angled surface portion 332 and the flat surface portion 334 of stop 330 engage with the angled portion and flat portion of recessed surface portion 238 like a puzzle piece. If the electrical charging assembly 200 were upside down, when inserted into electrical charging port 300 surface 246 of second male terminal member 206 would contact stop 330 and be prevented from full insertion and contact with electrical contacts 304.

As shown in FIG. 13, when electrical contacts 216 and 226 of male terminal members 204 and 206, respectively, engage with electrical contacts 304 and 306, the electrical contacts 304 and 306 are compressed, as these contacts may be in the form of spring loaded pins. Electrical contacts 304 and 306 may be compressed from their fully extended position at line 400 to their compressed position (not shown) at line 402. Each of electrical contacts 304 and 306 are shown to include five spring loaded pins. The number of pins used is dependent upon the expected electrical current to be carried during the charging process and the capacity of the individual pins. The use of multiple spring loaded pins for the electrical contacts is beneficial to ensure proper contact with the electrical contacts 216 and 226 of male terminal members 204 and 206 even in the case of manufacturing variations and wear on components.

When electrical contacts 304 and 306 are in the compressed position, magnets 360a-e of electrical charging port 300 are in close proximity with metal contacts 260a-e of electrical charging assembly 200 and they magnetically engage to secure in place electrical charging assembly 200 and electrical charging port 300. In this position, it can be seen that upper and lower curved surfaces 230 and 240 of male terminal members 204 and 206, respectively, are complimentarily engaged with surfaces 312 and 314 of cavities 308 and 310, respectively.

Also depicted in FIG. 13 are bus bar 410 of first male terminal member 204 and bus bar 412 of second male terminal member 206. The bus bars are connected to mount 414 to affix them within electrical charging assembly 200 at the end opposite electrical contacts 216 and 226.

A charger docking station 500 is depicted in FIGS. 14a-c. Electrical charging assembly 200 is affixed to frame 502 of charger docking station 500 by means of a mount 504 on which electrical charging assembly 200 is disposed. Mount 504 is connected to top and bottom walls 506 and 508, respectively, by compliant members 510a-d. Compliant members 510a-d, which may include springs, allow electrical charging assembly 200 and mount 504 a certain amount of movement in all six degrees of freedom to account for small errors in navigating the robot to the docking station while still enabling proper mechanical and electrical connection between the electrical charging assembly 200 and electrical charging port 300.

Frame 502 of charger docking station 500 also includes side walls 512 and 514, as well as rear wall 516. Frame 502 may be secured to the floor or a wall in the warehouse space. As described above, fiducial markers 520 and 522 (e.g. a two-dimensional bar code) are affixed to the frame 502 and are used by the robots to locate the charging station in the same manner as the robots locate bin locations, as described above. Once in proximity to the charger docking station 500, the robots use their on-board camera to complete the docking process.

Referring to FIG. 14b, within frame 502 there is a charging unit 530 which is connected to the warehouse power supply and outputs power via cable 532 to electrical charging assembly 200. Power cable 532 is provided with an amount of slack to accommodate movement of the electrical charging assembly 200 during the mating and un-mating process. As the robot moves away from the charger docking station 500 (during the un-mating process), due to the magnetic connection between the electrical charging assembly 200 and the electrical charging port 300 (described above), electrical charging assembly 200 will be pulled in the direction of movement of the robot until the magnetic force is overcome. In order to ensure that the movement is limited, a cable 534 or some other restraining means may be provided to interconnect the mount 504 on which electrical charging assembly 200 is disposed to the rear wall 516 of the frame 502.

Referring again to FIG. 14b, there may be provided an infrared transceiver 540 affixed to electrical charging port 300 and infrared transceiver 542 affixed to charging unit 530 of charger docking station 500 to enable communication between the robot and the charger docking station during the charging process, e.g. charging state and battery temperature.

We claim:

1. An electrical charging system, comprising:
   An electrical charger assembly, including:
   A charger base;
   A first male terminal member having a first base affixed to and extending orthogonally along a first axis from a first surface of the charger base and terminating in a first electrical contact, wherein the first male terminal member has at least one external surface curved from the first base to the first electrical contact; and
   A second male terminal member having a second base affixed to and extending orthogonally along a second axis from the first surface of the charger base and terminating in a second electrical contact, wherein the second male terminal member has at least one external surface curved from the second base to the second electrical contact; and
   An electrical charging port configured to receive the electrical charger assembly.

2. The electrical charging system of claim 1 wherein the first male terminal member has a plurality of external surfaces at least two of which are curved from the first base to the first electrical contact and at least one flat surface; wherein the second male terminal member has a plurality of external surfaces at least two of which are curved from the second base to the second electrical contact and at least one flat surface; and wherein there is further included a cavity formed between the first male terminal member and the second male terminal member having an opening between the first and second electrical contacts, the at least one flat surface of the first male terminal member has a recessed surface portion proximate the opening of the cavity and the at the least one flat surface of the second male terminal member has a flared surface portion proximate the opening of the cavity and angled relative to the second axis.

3. The electrical charging system of claim 2 wherein the charger base is coupled to an electrical power source and the electrical charging port is coupled to a battery of a device to be charged, the electrical charging port configured to receive the electrical charger assembly to electrically charge the battery of the device to be charged.

4. The electrical charging system of claim 3 wherein the electrical charging port comprises a first cavity and second cavity, which are configured to receive and engage with the first male terminal member and the second male terminal member, respectively, of electrical charging assembly.

5. The electrical charging system of claim 4 wherein the first cavity includes a first electrical contact comprising spring loaded pins configured to engage with the first electrical contact of the first male terminal member and the second cavity includes a second electrical contact comprising spring loaded pins configured to engage with the second electrical contact of the second male terminal member.

6. The electrical charging system of claim 5 wherein curved surfaces of the first male terminal member and the curved surfaces of the second male terminal member have a first radius of curvature.

7. The electrical charging system of claim 6 wherein the first cavity comprises curved surfaces having a second radius of curvature and the second cavity includes curved surfaces having the second radius of curvature; wherein the first radius of curvature is substantially equal to the second radius of curvature.

8. The electrical charging system of claim 5 wherein the first cavity has a width and length at its opening which is greater than a width and length of the first male terminal member proximate the first electrical contact and the second cavity has a width and length at its opening which is greater than a width and length of the second male terminal member proximate the second electrical contact.

9. The electrical charging system of claim 5 further including a divider disposed between the first cavity and the second cavity to separate the first cavity and the second cavity, the divider configured to be received in the cavity of electrical charging assembly when the electrical charging assembly and the electrical charging port are mated.

10. The electrical charging system of claim 9 wherein the divider includes a stop on a surface of the divider to prevent the electrical charger assembly from being improperly mated with the electrical charging port if the first male terminal member is being engaged with the second cavity and the second male terminal member is being engaged with the first cavity.

11. The electrical charging system of claim 10 wherein the stop includes an angled surface portion and flat surface portion configured to engage with the recessed surface portion within the cavity of the electrical charging assembly, thereby allowing proper mating of electrical charging assembly and the electrical charging port.

12. The electrical charging system of claim 3 wherein one of the electrical charging assembly and the electrical charging port includes a plurality of magnets and the other of the electrical charging assembly and the electrical charging port includes a corresponding plurality of metal contacts which engage when the electrical charging assembly and the electrical charging port are mated to secure them in place by way of magnetic force.

13. The electrical charging system of claim 12 further including a docking station having a frame to which the electrical charging assembly is affixed.

14. The electrical charging system of claim 13 wherein electrical charging assembly is disposed on a mount and the mount is secured to the frame by way of a plurality of compliant mounting members to allow movement of the electrical charging assembly in all six degrees of freedom.

15. The electrical charging system of claim 14 wherein the docking station includes a fiducial marker identifying the location of the docking station.

16. The electrical charging system of claim 14 wherein the docking station includes a charging unit electrically connected to electrical charging assembly to provide power for charging the device.

17. The electrical charging system of claim 16 wherein the docking station includes a restraining device interconnected to the frame of the docking station and the mount on which the electrical charging assembly is disposed to limit movement of the electrical charging assembly during the un-mating process.

18. The electrical charging system of claim 16 wherein the charging unit includes a transceiver and the electrical charging port includes a transceiver to enable communication between the charging unit and the device during the charging process.

19. The electrical charging system of claim 16 wherein the device being charged is a robot.

20. An electrical charging system for a robot, comprising:
   An electrical charger assembly, including:
      A charger base;
      A first male terminal member having a first base affixed to and extending orthogonally along a first axis from a first surface of the charger base and terminating in a first electrical contact, wherein the first male terminal member has at least one external surfaces curved from the first base to the first electrical contact;
      A second male terminal member having a second base affixed to and extending orthogonally along a second axis from the first surface of the charger base and terminating in a second electrical contact, wherein the second male terminal member has at least one external surface curved from the second base to the second electrical contact; and
      A cavity formed between the first male terminal member and the second male terminal member having an opening between the first and second electrical contacts; and
   An electrical charging port including at least one cavity configured to receive, the first and second male terminal members of the electrical charging assembly.

* * * * *